UNITED STATES PATENT OFFICE.

ALBERT HAYES, OF NEW YORK, N. Y., ASSIGNOR, BY MESNE ASSIGNMENTS, TO WILLIAM SAUNTRY METALS COMPANY, A CORPORATION OF MAINE.

SOLUTION FOR TREATMENT OF IRON OR STEEL.

No. 913,657.  Specification of Letters Patent.  Patented Feb. 23, 1909.

Application filed June 28, 1906, Serial No. 323,936. Renewed July 16, 1908. Serial No. 443,838.

*To all whom it may concern:*

Be it known that I, ALBERT HAYES, a citizen of the United States, residing at New York, in the county of New York, State of New York, have invented certain new and useful Improvements in Solutions for the Treatment of Iron and Steel, of which the following is a description.

My invention relates to a solution for the treatment of iron or steel for the purpose of imparting to it increased toughness or tensile strength without destroying its hardness, and the invention consists in the solution herein described and particularly pointed out in the claims.

It is common in the art to harden or temper steel by first heating it and then immersing it in water or oil which may or may not contain chemicals in solution. It has been claimed that the addition of certain chemicals, such for instance as cyanid of potassium, to the water gives better results as far as hardness is concerned than water alone. But so far as I am aware it has not been heretofore known that by the addition of certain chemicals to water in which heated iron or steel is immersed an increase in the toughness of the iron or steel can be produced.

By the use of the solution hereinafter described a marked increase in the toughness or tensile strength of iron or steel subjected to its action while heated is produced amounting to a complete change in the internal structure of the iron or steel so treated.

The characteristic element of the solution of my invention is hippuric acid, but I find the best results are secured from a solution containing in addition to hippuric acid, magnesium chlorid, chlorin, sal ammoniac, chlorid of sodium and a small amount of ammonia. These elements are preferably used in the following proportions to a gallon of water: hippuric acid, 1/500 to 1/300 oz., magnesium chlorid, 1/300 oz., chlorin water, 1/20 oz., sal ammoniac, 4 oz., chlorid of sodium, 4 oz., ammonia, 1/800 oz., water, 1 gal.

In treating iron or steel I heat the iron or steel to redness and either immerse it while hot in the solution or subject it hot in a closed chamber under pressure to the vapor or gas into which the solution is converted by the heat of the article treated.

I find that steel treated as above described is so changed in internal structure as to become fibrous so that it can be broken only with great difficulty and by tearing the fibers apart the fracture presenting the appearance characteristic of the best wrought iron. At the same time the capacity of the steel for being hardened or tempered is not destroyed or apparently lessened.

It will of course be understood that I do not desire to be limited to the precise proportions of the chemicals above specified or to the precise strength of the solution. While I have above stated the proportions as successfully used by me in the treatment of iron and steel I have not found it necessary to weigh or measure the ingredients precisely or to make the solution of the precise strength specified.

I do not herein claim the process of treating iron or steel with the solution above described nor the product produced by such treatment, such process and product forming the subject-matter of a separate application No. 323,934 filed June 28, 1906.

Having thus described my invention, what I claim as new and desire to secure by Letters Patent of the United States is:—

1. A solution for the treatment of iron or steel containing a chlorid and hippuric acid.
2. A solution for the treatment of iron or steel containing a chlorid, chlorin and hippuric acid.
3. A solution for the treatment of iron or steel containing chlorids and hippuric acid.
4. A solution for the treatment of iron or steel containing chlorids, chlorin and hippuric acid.
5. A solution for the treatment of iron or steel containing chlorid of ammonium (sal ammoniac) and hippuric acid.
6. A solution for the treatment of iron or steel containing chlorid of ammonium, (sal ammoniac) chlorid of magnesium and hippuric acid.
7. A solution for the treatment of iron or steel containing chlorid of ammonium (sal ammoniac), chlorid of magnesium, chlorin and hippuric acid.
8. A solution for the treatment of iron or steel containing chlorid of ammonium (sal ammoniac). chlorid of magnesium, chlorid of sodium (common salt) chlorin and hippuric acid.

9. A solution for the treatment of iron or steel containing chlorid of ammonium (sal ammoniac) chlorid of magnesium, chlorid of sodium (common salt), chlorin, ammonia and hippuric acid.

In testimony whereof I affix my signature, in presence of two witnesses.

ALBERT HAYES.

Witnesses:
A. P. GREELEY,
WM. J. WHOLLEY.